United States Patent Office 3,163,595
Patented Dec. 29, 1964

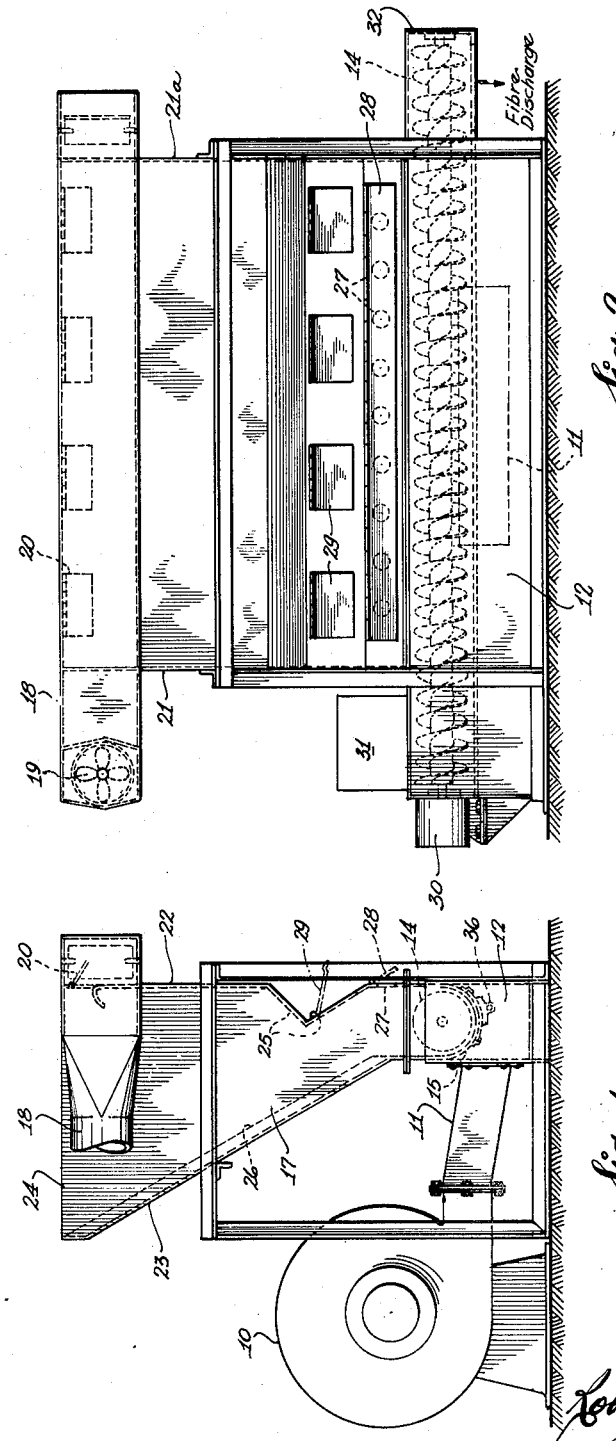

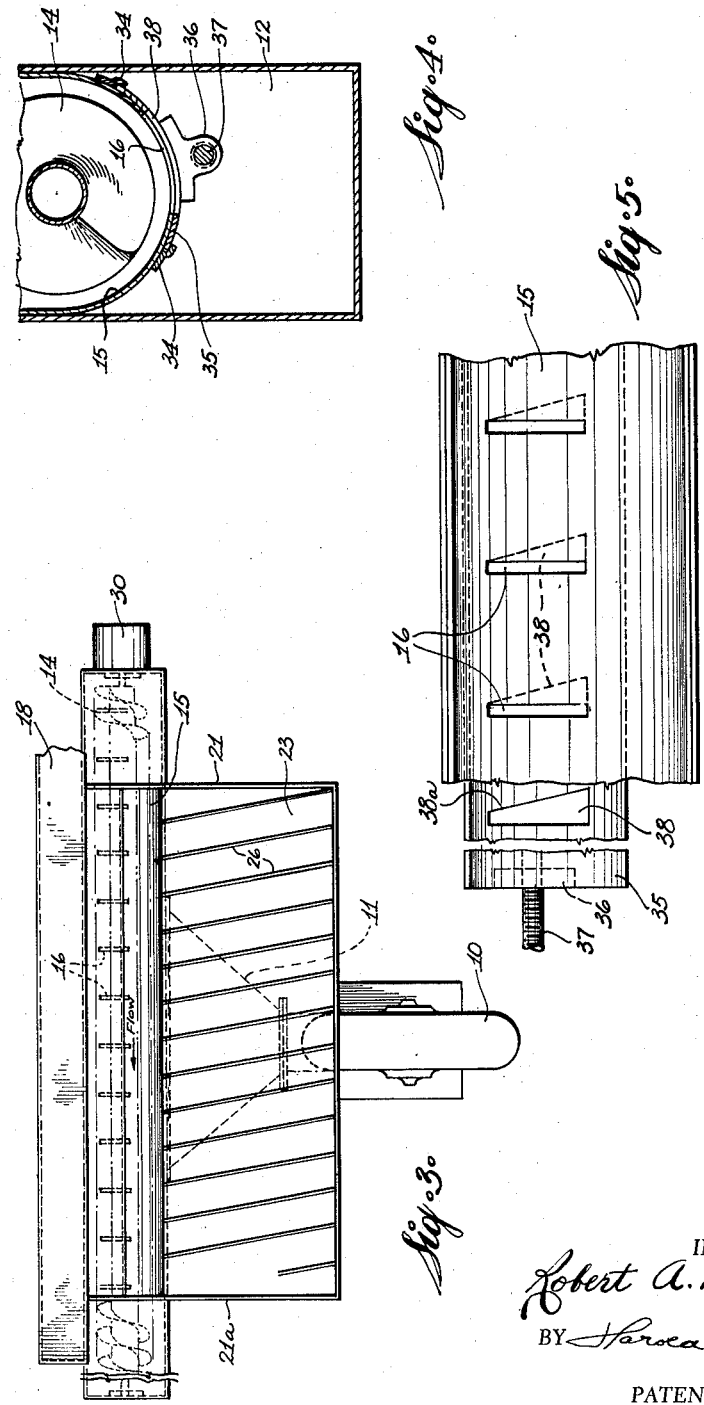

3,163,595
AIR WASHER FOR ASBESTOS FIBRE
Robert Andrew Denovan, Dalkeith, Ontario, Canada
Filed Nov. 29, 1961, Ser. No. 155,639
3 Claims. (Cl. 209—140)

This invention relates to an apparatus for cleaning fibrous material, and in particular it relates to apparatus which uses air to remove dust particles from asbestos fibre.

While the apparatus of this invention may be used to remove foreign matter such as dust from fibrous material, it is particularly adapted for removing dust from asbestos fibre and will be described in this respect. It is not, however, the intention to limit the invention only to the air washing of asbestos fibre.

Asbestos fibre occurs in bundles in a host rock and is normally released from the host rock in a milling operation which comprises crushing the host rock to release the bundles of fibre, and in the same operation or in a subsequent operation opening or fluffing the bundles of fibre by a gentle abrading or similar action. The open asbestos fibre produced by the standard dry milling operation always contains considerable amounts of dust. It has been found that this dust is of two general types. The first type of dust is a fine granular material chiefly of the gangue or host rock that has been broken up in the milling operation. The second type of dust is a very fine floury dust and it appears to come from the asbestos fibre itself. The first type of dust, i.e. granular dust, is removable by screening, but the second type of floury dust is not readily removable by screening. This invention is concerned with the removal of this very fine floury dust.

In the past various attempts have been made to remove this very fine dust from asbestos fibre. One type of prior art apparatus uses a mechanical working of the fibre to loosen the fine dust, and this working is done by a beater mechanism operating in a fine mesh cylindrical screen. Asbestos fibres are very delicate and any mechanical working tends to break down the long asbestos fibres into shorter fibres. Since the commercial value of the fibre depends on length, it is desirable that mechanical working should be kept to a minimum. This is one of the disadvantages of this type of prior art apparatus. Another disadvantage is the fine mesh screen of the prior apparatus tends to clog or blind and repeated cleaning is necessary.

Another type of prior art apparatus makes use of air to remove fine particles and dust. In this apparatus the dirty asbestos fibre is placed inside a horizontal cylindrical screen at one end and air is passed outwards through the screen to carry away the fine particles. A baffle is rotated inside the cylindrical screen to alter the air flow through the screen so that the pressure on the fibre caused by the outward air flow is periodically reduced. This alternating pressure and changing air flow loosens granular particles and dust particles which are carried away in the air flow. The periodic reduction in air pressure on the fibre each time the rotating baffle passes, and the general flow of air from the inlet end of the cylinder, causes a movement of the fibre along the cylindrical screen from the input end towards the output. It is sometimes a disadvantage of this apparatus that the rate of movement or processing is relatively low. Another disadvantage appears to be that the air flow over the fibre and the change in pressure are normally not sufficient to remove a high percentage of the very fine dust.

The present invention seeks to overcome the disadvantages of the prior art apparatus. The invention uses air to remove the fine particles of dust and thereby keeps to a minimum the amount of mechanical work done on the fibre. The invention provides a series of relatively sharp blasts of high velocity air in conjunction with a steady average air flow to loosen the very fine dust particles and carry them away. The fibre is carried through the apparatus by a conveyor so that the rate of processing is relatively high.

It is therefore an object of this invention to provide an improved apparatus for removing fine particles from asbestos fibre by using a series of air blasts.

It is another object of this invention to provide apparatus for applying a series of jets of high velocity air to asbestos fibre as the fibre is carried along a conveyor and thereby remove fine dust particles.

It is a further object of this invention to provide apparatus for removing dust particles from asbestos fibre and for removing very fine asbestos fibres from asbestos fibre of various sizes as it moves along a conveyor.

Further objects and advantages of this invention will appear from the following description taken in conjunction with the drawings, in which:

FIGURE 1 is an end elevation of apparatus according to one embodiment of the invention, FIGURE 2 is a front elevation of the same apparatus, FIGURE 3 is a partial top view of the apparatus with certain portions removed to simplify the drawing, FIGURE 4 is a fragmentary cross section of the conveyor housing and plenum chamber, and FIGURE 5 is a partial view of the top of the conveyor housing showing the slide gate.

Briefly, the invention comprises, in a preferred embodiment, a screw type conveyor for moving asbestos fibre along a conveyor housing above a plenum chamber. Spaced slots across the bottom of the conveyor housing admit air from the plenum chamber. The air coming through the slots constitute jets of air which blow through the fibrous material dislodging the dust particles and blowing the dust particles and some of the finer fibres up into a separating chamber. A slowly moving upwards air flow in the separating chamber carries away the fine dust particles that are entrained in the air and permits the heavier fibres to fall back. Provision is made to increase the velocity of air flow upwards in the separating chamber so that very fine fibres may also be carried away if this is desired.

Referring particularly to FIGURES 1, 2 and 3, 10 represents a fan or blower which supplies air through an inlet duct 11 to a plenum chamber 12. The plenum chamber 12 extends underneath a conveyor screw 14, and a conveyor housing 15 forms part of the top closure of the plenum chamber. The conveyor housing 15 is provided with slots 16 through which flows air from the plenum chamber.

A separating chamber 17 is located above the conveyor screw 14, and an air outlet duct 18 provides an outlet for the air from the separating chamber 17.

The separating chamber 17 is enclosed at the bottom by the conveyor housing 15 and is defined or formed by end walls 21 and 21a, front wall 22, back wall 23 and a top closure 24. The separating chamber has a larger horizontal cross section at the top than at the bottom to decrease the velocity of the upward flow of air. In the embodiment shown, the back wall 23 slopes outwards towards the top to provide the increasing cross-section and also to provide a guide to direct fibre back to the conveyor.

When the apparatus is operating there is a flow of air through it. This air flow is originated by the fan or blower 10 which forces air through duct 11 to plenum chamber 12. The only exit for the air from plenum chamber 12 is through the slots 16, and consequently the air passes through these slots 16 at a relatively high velocity. The air flow through the slots 16 may be referred to as jets of relatively high velocity air. The air passes upwards from the slots 16 into the separating chamber 17 where the velocity of the air decreases because of the larger area of cross section to the flow. Thus, a steady flow of air is maintained upwards through the separating chamber 17 to the air outlet duct 18. The velocity of the air flow in the separating chamber is, of course, lower towards the top. A series of hinged control gates 20, or similar flow control devices, can be set at required openings to limit the flow of air from the separating chamber 17 to the outlet duct 18.

The back wall 23 is provided with several baffles 26 which extend from top towards the bottom of the back wall and are inclined in the direction of flow or movement of the asbestos fibre through the apparatus. As the velocity of the air flow in the separating chamber decreases, heavier bits of material or fibres in the air flow will fall onto the back wall 23. This material will slide down the back wall, guided ahead by baffles 26 until it falls into the conveyor housing 15 to be advanced by conveyor screw 14.

The front wall 22 of the separating chamber 17 has a deflector member 25 on it. This deflector 25 directs or deflects the air flow towards the rear wall 23 which slopes outwards. The deflector member 25 has two portions, a lower one which deflects the upward air flow towards the rear wall and an upper one which deflects settling particles away from the front wall to the center of the conveyor. Such a deflecting member 25 is not necessary for successful operation of the apparatus but it improves the separating action.

Under certain conditions, it may be desirable to increase the upward flow of air through the separating chamber 17 without increasing the air flow through slots 16. Provision is made for this. The front wall 22 is provided with a series of openings or supplementary air inlets 27 below deflector member 25. A hinged control gate 28 or similar device, covers the openings 27 and may be set at various positions to control the flow of air through openings 27. As the supplementary air inlets or openings 27 are below the deflector 25, the air entering through these openings 27 will also be influenced by the deflector 25.

The front wall 22 may, in addition, be supplied with one or more inspection doors 29. These inspection doors 29 may conveniently be set in the lower portion of the deflecting member 25 to provide good visibility.

As previously mentioned, in a preferred embodiment shown in the drawings, a conveyor screw 14 moves the asbestos fibre through the apparatus. The conveyor screw 14 may be operated by any convenient means such as by electric motor 30. An air lock inlet 31 is positioned at the inlet end of the conveyor screw 14. Such air locks are well known in the art. They permit solid material to pass through the air lock while greatly restricting air flow through the air lock. Asbestos fibre is supplied to the apparatus by some feeder device or conveyor and it enters through air lock 31 and falls on conveyor housing 15 in which is rotating conveyor screw 14. The conveyor screw 14 advances the asbestos fibre along the housing 15 so that the fibre passes over the slots 16. The air jets through these slots 16 each blow in turn through the fibre. The relatively high velocity of the air in the jet dislodges a large proportion of dust from the fibre and incidentally blows some of the lighter fibre up into the separating chamber 17. As the air stream in the separating chamber slows down, the fibre separates or drops out of the air stream onto the back wall 23. The fibre falls back into the conveyor, advancing as it descends along the inclined baffles 26. The asbestos fibre is conveyed or advanced across the series of slots 16 to an outlet air lock 32 where it is discharged. As before, air lock 32 permits fibre to pass through while greatly restricting air flow.

The fine dust is entrained in the upward air flow in chamber 17 and is carried out through the outlet duct 18. The outlet duct 18 normally discharges into a vacuum chamber or it may be passed through a fan, such as fan 19 shown in phantom in FIGURE 2, and centrifugal collector which catches any light fibres which may have been carried out with the dust.

A control is provided to adjust the size of the slots 16 for varying conditions and requirements. This control enables the effective width of the slot to be changed or the effective length of the slot. The slot size control is best described with reference to FIGURES 4 and 5 where the slots 16 are shown in the conveyor housing 15. The underside of the conveyor housing 15 has guides or runners 34 which support a slide gate 35. The slide gate 35 fits against the underside of conveyor housing 15 and extends over that part of the length of the conveyor housing which has the slots 16. The slide gate 35 is provided with some means for enabling the slide gate to be moved backwards and forwards in the runners 34. Means for slidably adjusting a member are well known, and may, for example, comprise a threaded bracket 36 mounted on the slide gate 35 and a corresponding screw member 37. The screw member 37 may be carried in the framework of the apparatus such that rotation of the screw member 37 will cause the slide gate 35 to move backwards or forwards.

The slide gate 35 is provided with apertures 38 which may be shaped substantially as shown in FIGURE 5. In the position of the slide gate 35, shown in FIGURE 5, the whole area of slot 16 is uncovered. It will be seen that if the slide gate is moved towards the right, it will close off a portion of slot 16 which extends the length of slot 16. That is, it will reduce the width of the slot 16 without altering its length. On the other hand, if the slide gate is moved towards the left in FIGURE 5, the inclined portion 38a of aperture 38 will begin to eclipse the slot 16. This will, in effect, decrease the length of slot 16. It will be apparent that this inclined portion will effectively reduce the width of a very small part of the slot 16 because one end of slot 16 will no longer be rectangular, however, this width reduction is negligible when compared to the length reduction.

It will be obvious that equivalent shapes of aperture 38 would give satisfactory results. For one example, instead of an inclined side 38a, a series of discrete steps could be used. Each step would provide an increment of length reduction.

The overall operation of the apparatus will now be clear. To summarize asbestos fibre is admitted through the inlet air lock 31, and it is advanced along conveyor housing 15 by conveyor screw 14. The fibre passes over slots 16 where an air jet blows through the fibre dislodging dust and carrying dust and lighter fibres upwards. The size of the slots 16 is adjusted to remove a maximum amount of dust for the type and quantity of fibre passing over the jets. The fine material, including both dust and lighter fibres, is carried up into the separating chamber. As the air flows upwards through the separating chamber 17, the air velocity decreases. The size of the separating chamber 17 and the reduction in the air velocity therein for a given air flow are designed so that there is a separation of the airborne fine material and the released dust only is carried away in the flow through outlet duct 18. The fibres taken up by the jets fall out in the separating chamber because of reduced air velocity and are guided back to the conveyor by the back wall 23 and baffles 26.

In some instances it is desirable to eliminate very fine fibre from the discharged or cleaned asbestos fibre. This can be done quite readily in the described embodiment. By opening the control gate 28 to admit supplementary air through openings 27, the rate of the air rising through the separating chamber 17 can be increased to the point where lighter fine fibre will be carried off with the dust.

The heavier fibres will fall back, as described before, and be carried along by conveyor screw 14 to be discharged at outlet air lock 32.

While the invention has been described in one form, it will be obvious to those skilled in the art that it is susceptible of various changes and modifications without departing from the spirit thereof, and therefore only such limitations should be imposed as are indicated in the appended claims.

I claim:

1. Apparatus for removing dust from asbestos fibre and the like comprising, asbestos fibre inlet means, asbestos fibre outlet means, a conveyor extending through the apparatus from said inlet means to said outlet means, a conveyor housing having a fibre supporting wall directly under the conveyor, said fibre supporting wall having a single row of apertures spaced along its length, walls extending upwards from said conveyor housing with a top closing member defining a separating chamber, air supply means for directing air upwards through the single row of apertures as jets of air, said separating chamber having a horizontal cross section that increases towards the top of the chamber to reduce the velocity of upward air flow and cause settling of heavier pieces of entrained material, one of the settling chamber forming walls parallel to the direction in which the conveyor extends being a sloping wall sloping inwards towards the bottom thereof for guiding settled material to the conveyor, inclined baffles on the sloping wall for guiding settled material in the direction of movement of the conveyor as it moves down the sloping wall, an air outlet at the top of the separating chamber, and air withdrawing means communicating with said air outlet.

2. Apparatus for removing dust and fine fibrous material from asbestos fibre comprising the combination of two vertical end wall members, a vertical front wall member, a top member and a sloping back wall member defining a seperating chamber, said back wall member sloping outwards towards the top of said chamber, a conveyor housing having a fibre supporting wall provided with a single row of slotted apertures spaced along the length of the fibre supporting wall, the fibre supporting wall being otherwise imperforate, said housing forming a bottom closure for the separating chamber, a screw conveyor mounted for rotation in said housing for advancing asbestos fibre along said fibre supporting wall from an input end thereof to an output end, an asbestos fibre air lock inlet at the input end of the conveyor housing, an asbestos fibre air lock outlet at the output end of the conveyor housing, walls defining a plenum chamber below said conveyor housing, fan means supplying to said plenum chamber air under pressure which flows upwards through said slotted apertures as relatively high velocity jets of air and through fibre thereabove for dislodging dust from the fibre and carrying dust and some fine material upwards, air inlets in said front wall for admitting a controlled amount of supplementary air to said separating chamber and increasing the upward air flow in said separating chamber, inclined baffles on the sloping back wall member for guiding settled material moving down the sloping back wall in the direction of movement of the conveyor, an air outlet at the top of said chamber, and fan means for withdrawing from said air outlet air with entrained dust and lighter fine material.

3. Apparatus as defined in claim 2, further including means to vary the size of said apertures comprising a slide gate mounted for slidable movement adjacent the underside of the fibre supporting wall, said side gate being provided with substantially triangular apertures having one side parallel to the slotted apertures, and control means for moving the slide gate longitudinally eclipsing varying portions of each of the apertures.

References Cited in the file of this patent

UNITED STATES PATENTS

| | | |
|---|---|---|
| 707,173 | Stanley | Aug. 19, 1902 |
| 1,593,729 | Stebbins | July 27, 1926 |
| 1,797,434 | McLaughlin et al. | Mar. 24, 1931 |
| 1,850,719 | Herz | Mar. 22, 1932 |
| 1,989,751 | Hagler et al. | Feb. 5, 1935 |
| 2,288,814 | Lindsey | July 7, 1942 |
| 2,803,346 | Weston et al. | Aug. 20, 1957 |
| 2,973,863 | King | Mar. 7, 1961 |
| 2,976,647 | Pickrell | Mar. 28, 1961 |